US007757963B2

(12) United States Patent
Kiolbassa et al.

(10) Patent No.: US 7,757,963 B2
(45) Date of Patent: Jul. 20, 2010

(54) HAND SHOWER

(75) Inventors: Michael Kiolbassa, Schramberg (DE); Jan Heisterhagen, Schutterwald (DE); Guenter Glunk, Fluorn-Winzeln (DE)

(73) Assignee: Hansgrohe AG, Schiltach (DE)

( * ) Notice: Subject to any disclaimer, the term of this patent is extended or adjusted under 35 U.S.C. 154(b) by 135 days.

(21) Appl. No.: 11/842,248

(22) Filed: Aug. 21, 2007

(65) Prior Publication Data

US 2008/0054090 A1 Mar. 6, 2008

(30) Foreign Application Priority Data

Aug. 30, 2006 (DE) ...................... 10 2006 041 954

(51) Int. Cl.
*A01G 27/00* (2006.01)

(52) U.S. Cl. ............................ 239/67; 239/71; 239/99; 239/525; 4/615

(58) Field of Classification Search .................. 239/67, 239/71, 525, 99; 4/615, 675, 678; 251/129.04
See application file for complete search history.

(56) References Cited

U.S. PATENT DOCUMENTS

| | | | | |
|---|---|---|---|---|
| 3,581,998 | A * | 6/1971 | Roche | 239/415 |
| 4,884,725 | A * | 12/1989 | Ahad et al. | 222/639 |
| 5,170,944 | A | 12/1992 | Shirai | |
| 5,174,495 | A | 12/1992 | Eichholz | |
| 5,349,985 | A | 9/1994 | Fischer | |
| 5,913,614 | A | 6/1999 | Elliott | |
| 5,960,857 | A | 10/1999 | Wash | |
| 5,975,162 | A * | 11/1999 | Link, Jr. | 141/231 |
| 6,250,558 | B1 | 6/2001 | Dogre Cuevas | |
| 6,322,005 | B1 * | 11/2001 | Kern et al. | 239/444 |
| 6,892,952 | B2 * | 5/2005 | Chang et al. | 236/12.12 |
| 6,956,498 | B1 | 10/2005 | Gauthier | |
| 7,019,241 | B2 * | 3/2006 | Grassl et al. | 200/339 |

FOREIGN PATENT DOCUMENTS

| | | | |
|---|---|---|---|
| DE | 1729195 | | 8/1956 |
| DE | 1729195 | U | 8/1956 |
| DE | 3338064 | A1 | 5/1984 |
| DE | 4410993 | A1 | 10/1995 |
| DE | 196 38 788 | A1 | 3/1998 |
| DE | 20115097 | U1 | 3/2002 |
| DE | 102 56 156 | A1 | 4/2004 |
| EP | 1323872 | A1 | 12/2002 |
| EP | 1 876 304 | A1 | 1/2008 |
| WO | WO 00/32314 | A1 | 6/2000 |
| WO | WO 2006/072799 | A1 | 7/2006 |

* cited by examiner

*Primary Examiner*—Dinh Q Nguyen
(74) *Attorney, Agent, or Firm*—Duane Morris LLP

(57) ABSTRACT

The handle of a hand shower accommodates a remote control which is triggered by once-only pressure on a key or another deformable element. The remote control contains a piezo-electric radio switch which is accommodated as a closed-off component in the handle. This switch acts on a receiver which is mounted on a wall connection bend and which is connected to a valve in the wall connection bend. The valve can be switched on and switched off with the aid of the remote control in the handle of the hand shower. In the switched-off state, the shower hose is not under pressure.

16 Claims, 1 Drawing Sheet

HAND SHOWER

BACKGROUND OF THE INVENTION

1. Field

The invention relates to a hand shower.

2. Description of Related Art

Hand showers are connected via a shower hose to an installation which supplies the water to the shower head of the hand shower via the shower hose. The shower hose, as a rule, is connected downstream of a mixing valve and of a changeover valve. To actuate the hand shower, that is to say switch it on and switch it off, action must be taken on the sanitary fitting. This may take place either with one hand, while the other hand holds the grip of the hand shower, or the hand shower is deposited in a holder.

Where a hand shower is concerned, it has already been proposed to arrange on the lower holder, fastened to the wall, for the wall bar a setting facility which is connected to a valve via a wire-bound or wirelessly operating remote control. The valve is arranged outside the shower booth (WO 2006/072799 A1).

SUMMARY

The object on which the invention is based is to configure a hand shower such that it can be operated more simply than has hitherto been possible in the prior art.

To achieve this object, the invention proposes a hand shower having a shower head, a handle, arranged on the shower head, for holding the shower head, a shower hose for supplying the hand shower with shower water, a connection for the shower hose, a valve which is arranged upstream of the shower hose, and with a remote control for opening and closing the valve, which remote control is arranged in the handle or the shower head and can be actuated when the shower is used.

Further developments according to the invention are found in the appended claims.

The user can now switch on and switch off the shower with the hand with which he holds it for showering. To switch it off, he does not need to deposit it beforehand or to make use of his second hand. The remote control and the arrangement of the valve upstream of the shower hose ensure that, in the switched-off state, the shower hose is not under pressure, which would contradict safety regulations.

In a development of the invention, there may be provision for the remote control to operate wirelessly. In particular, a radio remote control is suitable here, since it can operate independently of direction. The receiver of the remote control can therefore be arranged at any desired location, and the user, when operating the hand shower, does not have to be sure where the receiver is arranged.

According to the invention, in a development, there may be provision for the remote control, that is to say that part of the remote control which is assigned to the shower head or to the handle, operates so as to be maintenance-free. What is to be achieved thereby is that no exchange measures are required, such as the frequent changing of batteries or the like. In particular, there may be provision for the remote control to operate without external energy.

A particularly suitable possibility for implementing a maintenance-free remote control is for the remote control to contain a piezoelectric radio switch. These piezoelectric radio switches can be activated by means of a simple mechanical operation such that the mechanical operation generates a brief voltage which can emit a transmission pulse. This transmission pulse may be coded, so that, even inside a house, a remote control does not exert any influence on another valve not assigned to this hand shower. The voltage required for the remote control is generated here by means of a mechanical deformation of a piezoelectric element.

It has already been mentioned that the arrangement of the receiver for a remote control is not critical, since it is of course arranged at a fixed location in the same way as the valve. According to the invention, however, in a development, there may be provision for the receiver assigned to the remote control to be arranged in the region of the connection of the shower hose, in particular of a wall connection.

Whereas, in the prior art, the valve is arranged outside the shower booth, the invention proposes, in a development, that the valve be arranged directly at the connection of the shower hose, in particular a wall connection. A rapid reaction can consequently be achieved, since this represents the shortest distance for the water which is possible under safety conditions. Furthermore, after switching off, only the shower hose itself needs to run empty.

According to the invention, there may be provision for the valve and/or the receiver of the remote control in the wall connection bend to be battery-operated. Maintenance is less complicated or troublesome at this location than in the grip of the hand shower. Furthermore, somewhat more space is available here. The valve may be a solenoid valve or else a valve actuable by means of an electric motor.

The possibility of using a battery-operated valve is advantageous particularly for retrofitting. It is also possible, however, to use a water-operated generator for power supply.

In a development of the invention, there may be provision for the valve or the remote control to be actuated simply by pressure, and for the same action to be used also for switching off the valve again. This is a particularly simple method of actuation. The actuating element of the remote control may in this case be arranged in a part of the handle which is deformable or is covered by a diaphragm, so that there are no orifices, gaps or cracks which would, of course, cause trouble in a shower.

According to the invention, in a development, there may also be provision for the remote control to be configured such that, for example, a motor which sets a temperature adjustment of the valve in motion is switched on by pressure by another actuating element. Adjustment can then be stopped by further actuation. It is thereby also possible not only to cause the hand shower to be switched on and switched off, but also to bring about temperature adjustment.

There may also be provision for actuating a changeover valve in order to changeover to another consumer.

BRIEF DESCRIPTION OF THE DRAWINGS

Features, details and advantages of the invention may be gathered from the claims and the abstract, the wording of both of which becomes the content of the description by reference, from the following description of preferred embodiments of the invention and from the drawing in which:

DETAILED DESCRIPTION

Figure 1:
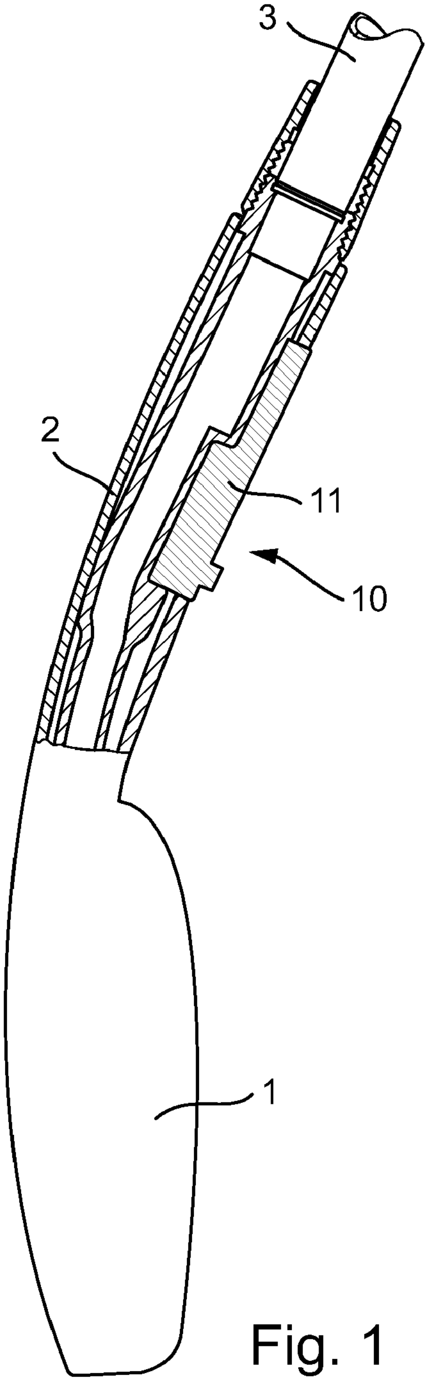
FIG. 1 shows a partially sectional side view of a hand shower according to the invention.
Figure 2:
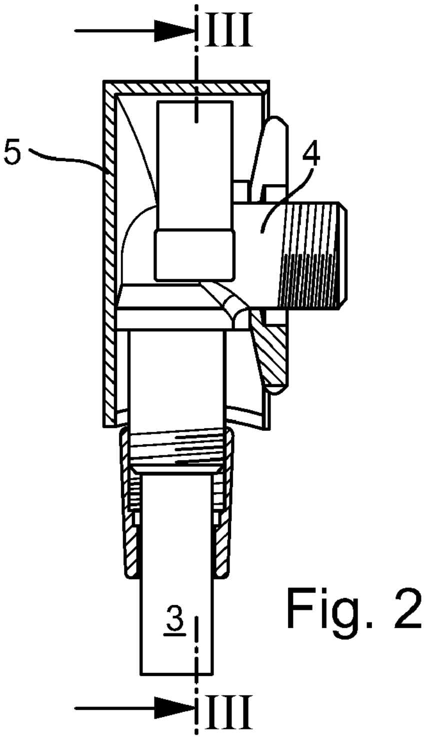
FIG. 2 shows a section through a wall connection bend with a valve.

FIG. 1 shows a side view of a hand shower with a shower head 1, comprising a handle or grip 2 leading into the shower head and a shower hose 3 connected to the outer end of the shower grip 2. Details of the shower head 1 of the hand shower are not illustrated. The shower hose 3, connected at one end to the end of the handle 2, is screwed at its other end to a wall connection bend 4 which makes the connection with a house installation accommodated in a wall. The wall connection bend 4 has a cover 5 which covers it visually. The cover 5 preferably consists of plastic and can be snapped subsequently onto the wall connection bend.

Flanged to the wall connection bend 4 is a solenoid valve 6 which experiences two states, to be precise an open and a closed valve. In the closed state, therefore, the water cannot flow through the wall connection bend 4 into the shower hose 3. Solenoid valves of this type are known and, moreover, they have lower current consumption.

Figure 3:
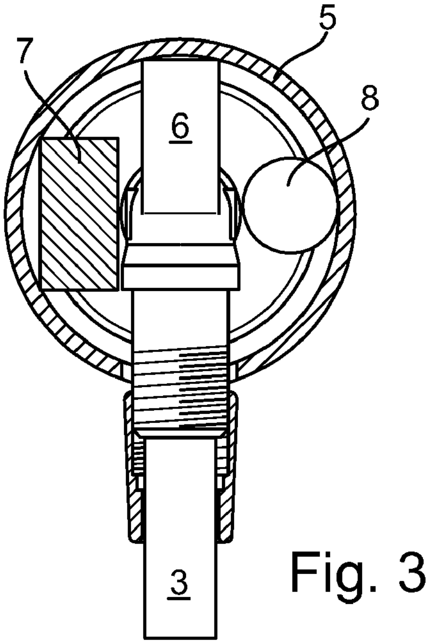
FIG. 3 shows a section through the arrangement of FIG. 2 along the line III-III in FIG. 2.

Arranged directly adjacently to the solenoid valve 6 is a radio receiver 7 which is operatively connected to the solenoid valve 6. To supply the solenoid valve and/or the radio receiver 7, a battery 8 is provided which is accommodated on the other side of that leg of the wall connection bend 4 which is directed into the wall. FIG. 3 shows that the cover 5 has a circular cross section. This corresponds to the shape of the otherwise customary rose.

A remote control 10 is arranged in the handle 2 of the shower on the underside, that is to say on the same side as the spray disc. This remote control is detected from the outside in the form of a key 11 which can be pressed somewhat into the interior of the handle 2. The remote control contains, as an encased unit, a piezoelectric radio switch, that is to say a structural element which emits a transmission pulse in a specific frequency range. This radio device is operated in that, by means of the said pressure, a piezoelectric element is induced to emit a voltage pulse which delivers the current supply for the radio device. By this remote control 10 being pressed once, a coded radio pulse is generated and emitted, which is received and interpreted by the receiver 7 and which leads to the solenoid valve 6 changing its state. It is consequently possible in a simple way to switch the water supply to the hand shower on and off, without the user having to let go of the hand shower or having to use his other hand.

It is also conceivable to use a servomotor instead of a solenoid valve.

It is also conceivable to arrange the receiver on a mixing fitting and then to carry out temperature adjustment with the aid of more than one key. The, if appropriate, additional actuation of a mixing valve for the temperature change by means of this technique affords a tremendous increase in operating convenience, along with a low outlay in installation terms. Such a control may be provided as a sole operating unit or as a parallel operating unit which can be actuated in addition to a unit arranged, for example, on the mixing valve.

The arrangement of a solenoid valve on the wall connection bend has the advantage that this solenoid valve can be mounted at a later stage.

What is claimed is:

1. Hand shower, comprising a shower head, a handle, arranged on the shower head, for holding the shower head, a shower hose for supplying the hand shower with shower water, a connection for the shower hose, a valve which is arranged upstream of the shower hose, and further comprising a remote control for opening and closing the valve, which remote control is arranged in the handle or the shower head and can be actuated when the shower is used, wherein the remote control operates wirelessly, and wherein the remote control is maintenance-free, wherein the remote control has a piezoelectric radio switch, and wherein the remote control is designed in such a way that the valve is switched on by means of one key pressure or the like and is switched off again by means of the same action.

2. Hand shower according to claim 1, wherein a receiver for the remote control is arranged in a region of a wall connection for the shower hose.

3. Hand shower according to claim 1, wherein the valve is arranged in a wall connection for the shower hose.

4. Hand shower according to claim 1, wherein the valve is battery-operated.

5. Hand shower, comprising a shower head, a handle, arranged on the shower head, for holding the shower head, a shower hose for supplying the hand shower with shower water, a connection for the shower hose, a valve which is arranged upstream of the shower hose, and further comprising a remote control for opening and closing the valve, which remote control is arranged in the handle or the shower head and can be actuated when the shower is used, wherein the remote control operates wirelessly, and wherein the remote control is maintenance-free, wherein the remote control has a piezoelectric radio switch, and wherein the remote control is de-signed in such a way that an adjustment of a mixing valve in the direction of a temperature change is triggered by means of one key pressure and the adjustment of the valve is stopped by means of a second key pressure.

6. Hand shower according to claim 5, wherein a receiver for the remote control is arranged in a region of a wall connection for the shower hose.

7. Hand shower according to claim 5, wherein the valve is arranged in a wall connection for the shower hose.

8. Hand shower according to claim 5, wherein the valve is battery-operated.

9. Hand shower, comprising a shower head, a handle, arranged on the shower head, for holding the shower head, a shower hose for supplying the hand shower with shower water, a connection for the shower hose, a valve which is arranged upstream of the shower hose, and further comprising a remote control for opening and closing the valve, which remote control is arranged in the handle or the shower head and can be actuated when the shower is used, wherein the remote control operates wirelessly, and wherein the remote control is maintenance-free, wherein the remote control has a piezoelectric radio switch, and wherein the remote control is designed in such a way that a positive temperature change is started and stopped by means of one key pressure.

10. Hand shower according to claim 9, wherein a receiver for the remote control is arranged in a region of a wall connection for the shower hose.

11. Hand shower according to claim 9, wherein the valve is arranged in a wall connection for the shower hose.

12. Hand shower according to claim 9, wherein the valve is battery-operated.

13. Hand shower, comprising a shower head, a handle, arranged on the shower head, for holding the shower head, a shower hose for supplying the hand shower with shower water, a connection for the shower hose, a valve which is arranged upstream of the shower hose, and further comprising a remote control for opening and closing the valve, which remote control is arranged in the handle or the shower head and can be actuated when the shower is used, wherein the remote control operates wirelessly, and wherein the remote control is maintenance-free, wherein the remote control has a piezoelectric radio switch, and wherein the remote control is designed in such a way that a negative temperature change is started and stopped by means of one key pressure.

14. Hand shower according to claim 13, wherein a receiver for the remote control is arranged in a region of a wall connection for the shower hose.

15. Hand shower according to claim 13, wherein the valve is arranged in a wall connection for the shower hose.

16. Hand shower according to claim 13, wherein the valve is battery-operated.

* * * * *